Dec. 29, 1970  EIZO GOTO  3,550,251

METHOD FOR MANUFACTURING A HEAT INSULATING VESSEL

Filed Aug. 7, 1968

United States Patent Office 3,550,251
Patented Dec. 29, 1970

3,550,251
**METHOD FOR MANUFACTURING A
HEAT INSULATING VESSEL**
Eizo Goto, Chigasaki-shi, Japan, assignor to Tokyo
Shibaura Electric Co., Ltd., Kawasaki-shi, Japan, a
corporation of Japan
Filed Aug. 7, 1968, Ser. No. 750,814
Claims priority, application Japan, Aug. 11, 1967,
42/51,397
Int. Cl. B21d *39/00;* B23p *19/04*
U.S. Cl. 29—455      2 Claims

ABSTRACT OF THE DISCLOSURE

A method for manufacturing a double-walled heat insulating vessel, wherein an inner cylindrical wall member open at one end and an outer cylindrical wall member similarly open at one end and of a larger size than the former member are so arranged as to keep the open ends thereof in substantially the same plane, the open ends are dipped as so positioned in a bath of molten vitreous composition, and after removal therefrom, both wall members are bonded together in an airtight manner with the vitreous material deposited and solidified at the open ends thereof.

BACKGROUND OF THE INVENTION

The present invention relates to the manufacture of a heat insulating vessel, and more particularly to a method for manufacturing a heat insulating vessel provided with mutually spaced cylindrical double walls whose intermediate sealed space is evacuated, namely, a vessel commonly known as a vacuum bottle or Dewar's vessel.

The process of manufacturing a heat insulating vessel provided with mutually spaced cylindrical double walls whose intermediate sealed space is evacuated, generally consists in bonding together in an airtight manner the respective open ends or lips of an inner cylindrical wall member open at one end and closed at the other and an outer cylindrical wall member similarly open at one end and closed at the other, which, excepting an exhaust tube fitted to the closed end, is of the same shape as, but a larger size than, the inner cylindrical wall member. Upon completion of the bonding of both inner and outer cylindrical wall members, there is applied through the exhaust tube to the opposite interior surfaces of the cylindrical double walls a plating solution to form a mirror plane thereon. After the plating solution is taken out, the intermediate space between the double walls is evacuated and finally the exhaust tube is sealed off completely to close up said interwall space.

The double wall members generally made of glass are bonded together by melting the open ends thereof by burner or high frequency heating.

However, since this melting heat tends to soften or deform the joints of the wall members and the parts nearby, the formation of a mirror plane on the opposite interior surfaces of the double walls has had to be carried out after the bonding of the wall members in order to prevent the damage of a mirror plane formed on the surfaces of the wall members due to such softening or deformation thereof.

Heretofore, the preparation of a mirror plane on the opposite interior surfaces of the double walls after the bonding of the two wall members was accompanied with a large number of difficulties with respect to the cleaning of the interior surfaces prior to the formation of the mirror plane, introduction and discharge of the plating solution and drying of the plated surface, so that the mirror plane thus formed was less uniform in thickness and more liable to present pin holes and failed to provide a satisfactory reflection surface. Accordingly, such defective mirror plane tended to be reduced in the heat insulating property.

SUMMARY OF THE INVENTION

The present invention provides a method for manufacturing a double-walled heat insulating vessel which enables a mirror plane to be formed on the opposite interior surfaces of the double walls prior to the joining of the open ends of the inner and outer cylindrical wall members. The present invention comprises the steps of arranging in substantially the same plane the respective open ends of an inner cylindrical wall member open at one end and closed at the other and already provided with a mirror plane on the outside and an outer cylindrical wall member similarly open at one end and closed at the other and provided with a mirror plane on the inside, which, excepting an exhaust tube fitted to the closed end, is of the same shape as, but a larger size than, the inner cylindrical wall member, dipping the open ends of both wall members in a bath of molten vitreous composition, after removal therefrom sealing the open ends with the vitreous material in an airtight manner, evacuating the interior space defined by the double wall members thus bonded through the exhaust tube and finally sealing it off.

The instant bonding of the inner and outer cylindrical wall members, which, according to the present invention, is effected by dipping the open ends thereof in a bath of molten vitreous composition, followed by removal therefrom, does not subject the other parts of the wall members than the dipped open end portions to any substantial softening or other physical deformations.

As a result, the mirror plane formed on the surfaces of the wall members prior to their bonding does not receive any damage even at the time of said bonding. Namely, the present invention safely permits the preparation of a mirror plane prior to the aforementioned bonding. The pre-bonding plating of a mirror plane on the wall members is carried out very easily using a plating solution, and both pretreatment and after-treatment of the surface of plating can be fully performed without any difficulties, so that the mirror plane obtained has an extremely excellent reflection surface.

DETAILED DESCRIPTION OF THE INVENTION

Figure 1:
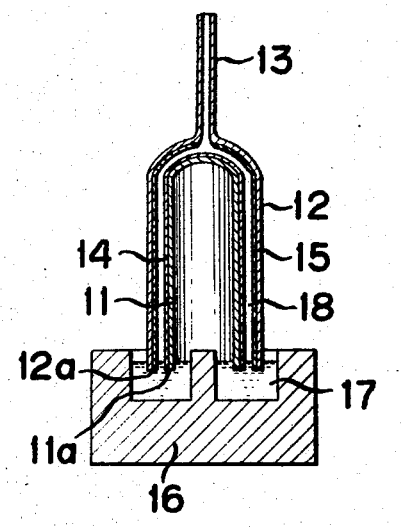
FIG. 1 is a longitudinal sectional view of the inner and outer cylindrical wall members where their open ends are dipped in a bath of molten vitreous composition for their mutual bonding.

In FIG. 1, numeral 11 represents an inner cylindrical wall member open at one end and closed at the other and numeral 12 denotes an outer cylindrical wall member similarly open at one end and closed at the other and provided with an exhaust tube 13 at the closed end. The inner cylindrical member 11 has a mirror plane 14 plated on the outside, whereas the outer cylindrical member 12 has a mirror plane 15 formed on the inside. Both wall members 11 and 12 are held in place by a suitable support means (not shown) in such a manner that the open ends 11a and 12a thereof are in substantially the same plane and that there is defined a void space 18 between both wall members 11a and 12a.

The open ends 11a and 12a of both wall members 11 and 12 thus positioned are dipped in a bath 17 of molten vitreous composition. The bath is kept in a refractory trough 16 provided with an annular tank and heated by a suitable heating means to a sufficiently high temperature to allow it to have a low viscosity of, for example, less than 100 poises. After dipped in the bath 17 for a short time, the open ends 11a and 12a of the wall members 11 and 12 are withdrawn. This operation causes both wall members 11 and 12 to be bonded together through the layer of vitreous material 17a (FIG. 2) deposited and solidified at the open ends 11a and 12a thereof.

Figure 2:
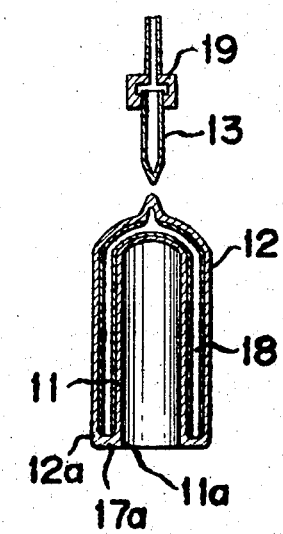
FIG. 2 is a longitudinal sectional view of the double walls formed from mutually bonded wall members where the exhaust tube fitted to the outside of the outer cylindrical wall member is sealed off after evacuation of the interior space of the cylindrical double walls.

The space 18 defined between both wall members 11 and 12 jointed together at the open ends 11a and 12a is evacuated as shown in FIG. 2 to a desired extent through an elastic connecting member 19 disposed in an evacuating passage and fitted to the outer end of the exhaust tube 13. The interwall space 18 is completely closed up when the exhaust tube 13 is finally sealed off.

Other conditions being equal, the thickness of the layer 17a of vitreous material deposited on the open ends 11a and 12a of both wall members 11 and 12 varies with the extent of depth to which the open ends 11a and 12a are dipped in the bath 17. Therefore where a greater bonded strength is required for the wall members 11 and 12, it is necessary to dip the open ends 11a and 12a more deeply into the bath 17. The deposition of a thicker layer 17a of vitreous material may also be effected by evacuating the interwall space 18 through the exhaust tube 13 while the open ends 11a and 12a of the wall members 11 and 12 are still dipped in the bath 17. For instance, a fully thick layer 17a of about 10 mm. can be obtained by evacuating only by 2 to 3 mm. Hg the interwall space 18 kept under an atmospheric pressure. Alternatively, this object may be attained by applying elevated air pressure to the surface of the bath exposed outside of the assembled wall members 11 and 12. In any case, the dipping of the wall members 11 and 12 in the bath 17 will not exert so harmful an effect as to damage the mirror plane previously formed on the surface thereof.

The formation of a mirror plane prior to the bonding of the wall members 11 and 12 which has been made possible by the present invention may be carried out by chemical plating, vacuum deposition or any other suitable means. Where chemical plating is employed, it is quite free from such difficulties as occurring in the pretreatment and after-treatment of the surface of plating, as well as in the introduction and discharge of the plating solution, all of which have heretofore been required and performed unavoidably through a narrow exhaust tube, when a mirror plane was formed after the bonding of wall members. Consequently a mirror plane chemically plated according to the method of the present invention displays extremely excellent reflection. Further, the pre-bonding formation of a mirror plane on the wall members by means of vapor deposition is far easier and more inexpensive.

According to the present invention, a heat insulating vessel may be provided with double walls made of metal, for example, stainless steel. In this case, a mirror plane to be formed on the surface of the inner and outer cylindrical wall members can be replaced by the thoroughly polished plane surface of the metal itself. Except for this, all the other manufacturing steps may be carried out in exactly the same manner as in the preceding case.

A heat insulating vessel provided with double walls, whether of glass or stainless steel, bonded with vitreous composition according to the method of the present invention more effectively prevents air leakage from the outside into the sealed interwall space, and also reduces heat transfer across the two wall members.

While the invention has been described in connection with some preferred embodiments thereof, the invention is not limited thereto and includes any modifications and alterations which fall within the scope of the invention as defined in the appended claims.

I claim:

1. A method for manufacturing a heat insulating vessel provided with cylindrical double walls whose interior space is evacuated, which comprises the steps of holding in substantially the same plane the respective open ends of an inner cylindrical wall member open at one end and closed at the other and provided with a mirror plane on the outside and an outer cylindrical wall member similarly open at one end and closed at the other and provided with a mirror plane on the inside, which, excepting an exhaust tube fitted to the closed end, is of the same shape as, but a larger size than, the inner cylindrical wall member, in such a manner that both wall members are properly spaced from each other, dipping the open ends of both wall members in a bath of molten vitreous composition and, after removal therefrom, bonding together the wall members in an airtight manner with the vitreous material deposited and solidified at the open ends thereof, evacuating through the exhaust tube the interior space of the double walls formed of the wall members thus bonded and, after completion of evacuation, sealing off the exhaust tube.

2. A method according to claim 1 wherein the intermediate space between both wall members is evacuated while the open ends thereof are dipped in the bath of molten vitreous composition.

References Cited

UNITED STATES PATENTS

| | | | |
|---|---|---|---|
| 923,136 | 6/1909 | Burger | 65—153X |
| 1,150,242 | 8/1915 | Bartlett | 53—9 |
| 1,172,247 | 2/1916 | Anders | 65—153X |
| 1,906,315 | 5/1933 | Davis et al. | 65—153X |
| 2,057,969 | 10/1936 | Payson et al. | 215—13 |
| 2,144,820 | 1/1939 | Thomas | 65—153X |
| 3,195,994 | 7/1965 | Lindsay | 65—153X |
| 3,423,817 | 1/1969 | Bobo | 29—455X |

CHARLIE T. MOON, Primary Examiner

U.S. Cl. X.R.

29—458, 460; 53—9; 65—34, 59, 153; 215—13; 264—262